(12) United States Patent
Patrito

(10) Patent No.: US 6,176,367 B1
(45) Date of Patent: Jan. 23, 2001

(54) DEVICE FOR CONVEYANCE ALONG ASSEMBLY LINES AND THE LIKE

(75) Inventor: Donato Patrito, Leini' (IT)

(73) Assignee: Fata Automation S.p.A., Pianezza (IT)

( * ) Notice: Under 35 U.S.C. 154(b), the term of this patent shall be extended for 0 days.

(21) Appl. No.: 09/257,491

(22) Filed: Feb. 25, 1999

(30) Foreign Application Priority Data

Feb. 25, 1998 (IT) .......................................... MI98 U 0112

(51) Int. Cl.[7] .................................................. B65G 15/10
(52) U.S. Cl. .................... 198/817; 198/465.3; 198/803.2
(58) Field of Search ............................... 198/817, 465.3, 198/803.2, 481, 836.1, 836.2, 834

(56) References Cited

U.S. PATENT DOCUMENTS

| | | | |
|---|---|---|---|
| 4,040,302 | * | 8/1977 | Katarao ..................................... 74/37 |
| 4,449,958 | * | 5/1984 | Conrad ................................. 474/205 |
| 4,736,830 | * | 4/1988 | Hofmann .............................. 198/345 |
| 5,074,402 | * | 12/1991 | Bender-Zanoni et al. ......... 198/626.1 |
| 5,183,144 | * | 2/1993 | Francioni .............................. 198/382 |
| 5,282,529 | * | 2/1994 | Schwammle ....................... 198/465.3 |
| 5,322,156 | * | 6/1994 | Kakita et al. ...................... 198/463.3 |
| 5,421,446 | * | 6/1995 | Koch et al. ....................... 198/369.7 |
| 5,884,753 | * | 3/1999 | Robertson et al. ................ 198/803.2 |

FOREIGN PATENT DOCUMENTS

| | | |
|---|---|---|
| 4407163 | 3/1994 | (DE) . |
| 184610 | 5/1981 | (IT) . |
| WO89/00525 | 1/1989 | (WO) . |

* cited by examiner

*Primary Examiner*—Christopher P. Ellis
*Assistant Examiner*—Rashmi Sharma
(74) *Attorney, Agent, or Firm*—Jacobson, Price, Holman & Stern, PLLC

(57) ABSTRACT

A device for conveyance along an assembly line of components and motor vehicle components in particular mounted on sled-like supports (27) having a pair of supporting shoes (28). The device comprises a pair of powered belts (18) parallel and extending in the direction of conveyance to receive on themselves the sled supporting shoes (28) for advancement thereof along the line. Each belt (18) of the pair is wound between a drive pinion (15) and an idling pinion (17) arranged at the two ends of the device and bears on its internal face in contact with the pinions (15,17) grooves (20) which in movement engage with corresponding projections (23) born by the pinions. The belt (18) is supported in the section between the respective two pinions (15,17) by idling rollers (22) having an external profile virtually matching the belt profile on said internal face.

8 Claims, 3 Drawing Sheets

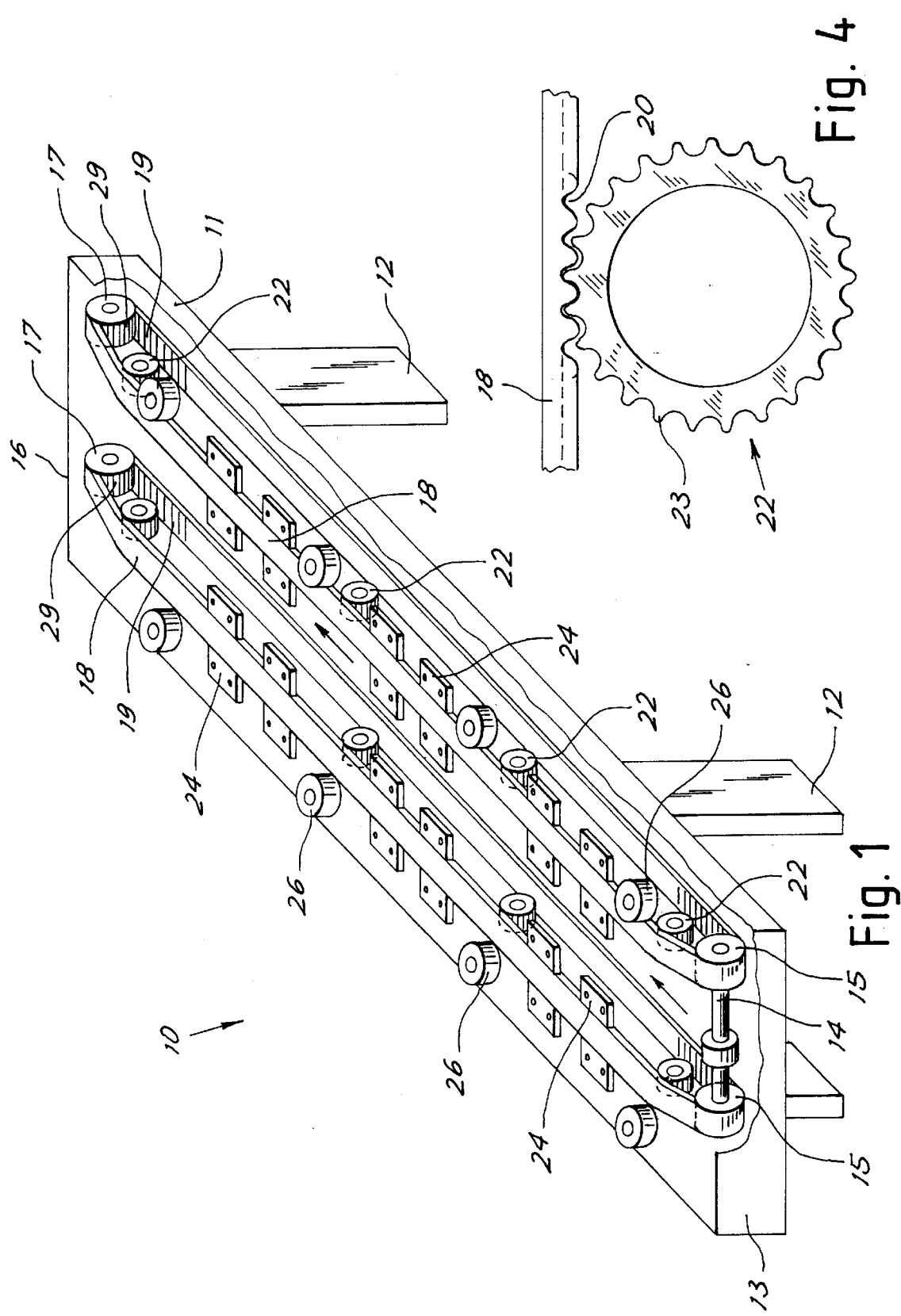

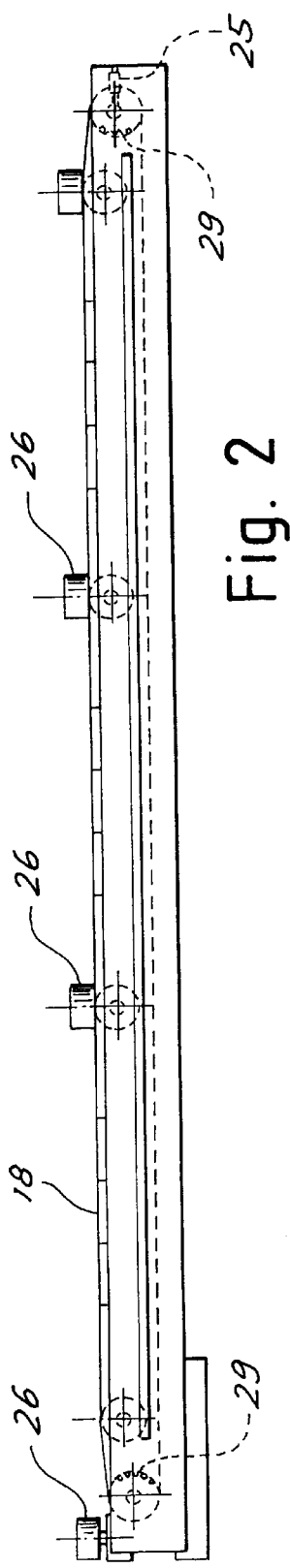
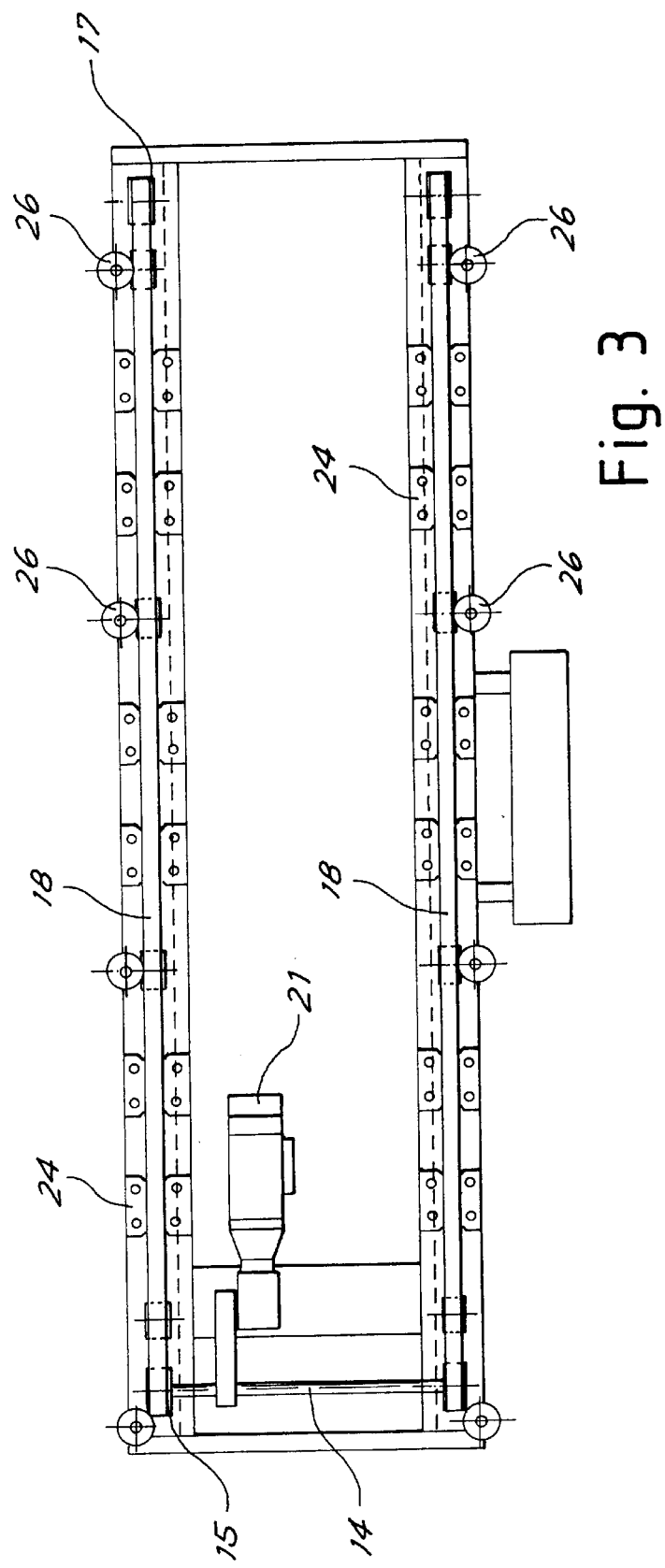

DEVICE FOR CONVEYANCE ALONG ASSEMBLY LINES AND THE LIKE

BACKGROUND OF THE INVENTION

The present invention relates to a handling device e.g. for moving parts to be assembled or completed along an assembly line. Specifically the device can be employed for moving the parts from one station to the next and positioning them exactly in front of the assembly equipment. Systems of movement between stations along assembly lines are widely used today in industry and in particular in the automobile industry (to which reference is made in this description by way of non-limiting example only).

At each station one or more parts of the body are arranged in the right position and attached to the body. The process is repeated on the necessary number of work stations until all the parts making up the body have been assembled to make up the complete body. Moving the components from one station to the next can be performed by different movement systems. Since the moving time between one station and the next is a non-productive time which must therefore be minimized the speed and accuracy of movement are decisive factors in the choice of movement systems. It is clear that investment and management costs are taken into due account in this choice.

In the course of the years there have been developed many moving systems each of which seeks to give priority to one of the aspects and all seeking the best compromise between performance and costs.

Basically these systems can be divided in three categories, to wit overhead self-movers which move the parts by means of a plurality of vehicles powered individually which run hanging from an overhead rail to transit in sequence above the work stations; 'raise and move' systems which move the parts by means of a long multiple apparatus which simultaneously moves all the bodies present in a section (10 to 15 stations) of the assembly line; 'skid' systems which move the parts by means of a series of floor conveyors on which move a plurality of sled-like apparatuses termed 'skid' on each of which is rested a part to be handled.

In general the skid system displays advantages from the point of view of purchase and management costs while movement time is normally longer than with the other systems. In its simplest form the skid system consists of a series of tables with powered metal rollers on which move the skids. In the course of the years numerous variations were developed on this base tending to improve performance of the system as concerns speed, positioning accuracy and noise level to improve the biotechnology in the work place.

The embodiment which best balances cost, speed, positioning accuracy, quietness etcetera is the double-belt version as described in Italian Utility Model No. 184.610 filed May 6, 1981 in the name of Fata European group S.p.A. In this version on the two sides of the running line there are parallel powered belts for conveying the skid which arrives on the table. The belts run above a continuous supporting table having side shoulders for continuous containment of the belts to prevent lateral slipping. Continuous support appears necessary for supporting the vertical load consisting of the sleds with the belts. Running on an unbroken surface makes unnecessary the use of toothed belts which would be too noisy and which wear out too fast and require large diameter drive pulleys and preloading of the smooth belt to avoid slipping. In the case of the small tapes applied to the skid tables the solution of having the belt slide on an unbroken supporting surface has become generally used because in the prior art it is believed that this solution is the best for reducing noise and facilitating guidance of the belt.

There is a need to further reduce idle times in movement while holding unchanged or improving positioning accuracy in the work stations and noise during moving. In known skid systems it is necessary to use additional centering devices for accurate positioning of the skid within each work station.

The general purpose of the present invention is to overcome the above mentioned drawbacks by making available a skid handling system which would reduce moving time between two successive work stations with positioning accuracy making the employment of additional centering devices for positioning the skid opposite the equipment of the work station not indispensable.

SUMMARY OF THE INVENTION

In view of this purpose it is sought to provide in accordance with the present invention a device for conveyance along the assembly line of components and motor vehicle components in particular mounted on sled-like supports having a pair of supporting shoes with the device comprising a pair of powered belts parallel and extending in the direction of conveyance to receive on themselves the sled supporting shoes for advancement thereof along the line with each belt of the pair being wound between a drive pinion and an idling pinion arranged at the two ends of the device characterized in that each belt bears on its internal face in contact with the pinions grooves which in movement engage with corresponding projections born by the pinions and that the belt is supported in the section between the respective two pinions by idling rollers with the external profile essentially matching the profile of the belt on said internal face.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows a diagrammatic axonometric view of a skid conveyance device in accordance with the present invention, FIGS. 2 and 3 show respectively plan and side elevation views of the device of FIG. 1, FIGS. 4 and 5 show enlarged views of details of the device of FIG. 1.

DETAILED DESCRIPTION OF THE INVENTION

Figure 5:
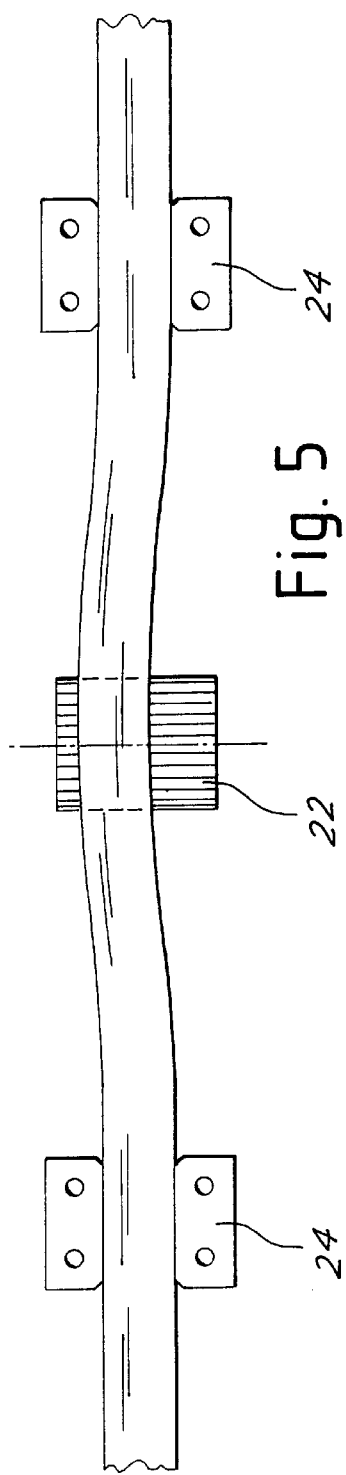

With reference to the figures, FIG. 1 shows a diagrammatic view of a device or conveyance table indicated as a whole by reference number 10 comprising a supporting frame 11 having supporting legs 12. Opposite one end 13 of the table is supported in a turning manner a transverse shaft 14 to whose ends are keyed two toothed pinions 15. The shaft is powered by an electric motor 21 shown in FIG. 3. At the opposite end 16 of the table are supported in a freely turning manner two toothed idling pinions 17. Around each powered and idling pinion pair located on the same side of the table is wound a continuous conveyor belt 18 having its surface 19 designed to enter into contact with the pinions which display a series of grooves or recesses 20 with profile matching that of the teeth or projections 29 of the pinions.

With each belt is associated a known tightening device 25 as may be seen in FIGS. 2 and 3 having the function of adjusting the correct belt operating tension.

The upper branch of the belt is supported by a plurality of supporting rollers 22. The rollers have their external surface displaying a series of teeth or projections 23 matching the recesses in the belts in such a manner as to engage with the grooves in the belt as may be seen in FIG. 4. This reduces considerably the noise caused by movement of the belt on the rollers.

The projections 23 are advantageously of a height less than the height of the belt recesses.

The supporting rollers may be of steel or advantageously with at least the external band of elastomeric material (e.g. polyurethane) for further improvement of noise characteristics. The use of elastomeric material displays the further advantage of ensuring better distribution of the load transmitted from the skid to the belt and from the belt to the roller to decrease the concentration of tension on the belt to benefit belt life.

Advantageously the supporting rollers 22 are arranged at a height higher than that of the pinions 15, 17. This limits to occasional situations the contact of the skid with the belt in the zone where the belt is engaged with the drive or transmission pinion and is thus already subjected to stress owing to drawing and winding to which are thus not added those due to load support. The life of the belt is thus greatly increased.

The inclined section created in the zone of first contact between the skid and the belt favors 'soft' coupling between the skid and the belt in the stage of dropping of the ends of the skid on the table receiving it. This way skid positioning accuracy on the table is improved and a harmful blow to the structure is prevented.

The belts are guided laterally by a plurality of guide shoes 24 arranged in intermediate position with respect to the supporting rollers 22. The shoes can be of resin or metal.

During operation the belts are subject to lateral forces which tend to push the belt off the pinions. To prevent this in the prior art there are usually employed continuous or sectored guides which act on the sides of the belt to cause more or less rapid wear depending on the forces in play because the guides tend to oppose side movement which though small could exert considerable forces.

Arrangement of the shoes 24 follows a contrary logic. In the embodiment in accordance with the present invention the shoes are arranged in such a way as to not prevent movement of the belt under the effect of the forces which tend to displace it. The shoes are arranged in such a manner as to guide the belt at points where it is free to shift sidewise under the effect of a small force. This is obtained by arranging the shoes in an intermediate position between the supporting rollers. With this arrangement the belt is not subjected to considerable stresses due to the simultaneous bucking action of forces tending to cause deviation thereof and forces tending to hold it in a certain position.

As shown diagrammatically in FIG. 5 the belt is free to deviate under the action of the deviating forces developing at points of contact with the supporting rollers but is brought gently back to the central position by the action of the guide shoes located intermediately between two rollers where the belt is free to move laterally because it is not constrained by the skid and supporting roller.

Guide rollers 26 with vertical axis are arranged laterally outside the belts and in a position above them to supply a guide function for the pair of shoes 28 of the skids which will be conveyed by the device.

Figure 6:
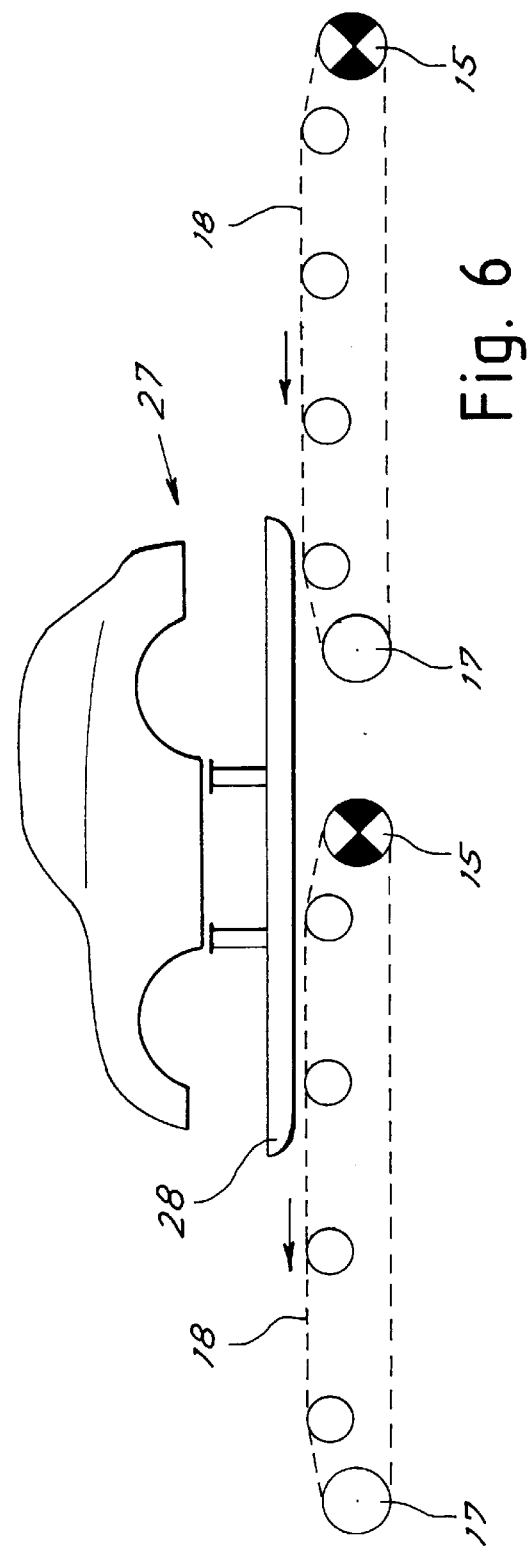
FIG. 6 shows a diagram of the passage of a skid from one table to the next.

FIG. 6 shows diagrammatically the passage of a skid 27 with supporting shoes 28 between two devices embodied in accordance with the present invention. The beneficial effect of the difference in height of the pinions and support rollers is noted.

It has been found that to obtain better skid positioning accuracy the drive pinion 15 should be located in a rear position or upstream with respect to the direction of travel contrary to the usual arrangement which calls for front powering. In this manner during braking the inertial force of the skid is transferred to the pinion through a length of belt equal to approximately half the length of the table while with the motor located in front the length would be equal to approximately one and one half times the length of the table, i.e. the length of the lower branch plus one half the length of the upper branch considering the inertial force applied to half the skid. Minimizing the length minimizes the positioning error due to elastic elongation of the belt.

The rear arrangement of the motor also improves winding and coupling of the belt with the drive pinion in the emergency braking stage in which occurs transmission of the greatest forces from the skid to the pinion. Not last, rear lowered arrangement of the drive pinion facilitates entry and gradual increase of traction force during passage from one table to the next.

At this point it is clear that the preset purposes have been achieved.

With the solution in accordance with the present invention it is possible to use toothed belts while at the same time keeping noise and belt wear very low. The need for large preloads on the belts is also eliminated and it is possible to use small diameter drive pulleys.

Belt movement takes place perfectly synchronously with any running between drive pinion and belt prevented by the positive coupling of the pinion teeth with the belt recesses. Positive coupling also permits transmitting considerable force from the pinion to the belt and from the latter to the skid to make possible acceleration and deceleration which in turn make possible achieving greater speeds in the stage of transfer of the skid from one table to the next. Increase in speed and reduction of the space necessary for reaching maximum speed thus make possible a considerable reduction in transfer time.

Support of the upper branch of the belt by rollers drastically reduces the passive resistance originating during movement in the contact zone between the belt and the member supporting it.

Reduction of passive resistance in addition to eliminating at the source the possibility of local overheating of the belt during high speed movement permits employment of a drive unit comprising motor, reducer, transmission and electrical control equipment having relatively low power because the installed power is utilized almost completely for acceleration and deceleration and is not dissipated in dragging.

The device proposed is also of economical and strong construction and of certainly competitive cost compared with known solutions which are also less efficient. Naturally the above description of an embodiment applying the innovative principles of the present invention is given by way of non-limiting example of said principles within the scope of the exclusive right claimed here.

For example the number of rollers and the general proportions of the device could differ depending on the specific requirements. In addition the lateral belt-guides could be provided not only as shaped plates but also in the form of idling rollers.

What is claimed is:

1. Device for conveyance along an assembly line of heavy components mounted on sled-like supports having a pair of sled supporting shoes the, device comprising:

a pair of parallel powered belts extending in a direction of travel to receive on the belts the sled supporting shoes for advancement thereof along the assembly line with each belt of the pair being wound between a drive pinion and an idling pinion arranged at two ends of the devices an internal face of the belt, in contact with the pinions, including grooves which in movement engage with corresponding projections born by the pinions and the belts being supported in a section between the respective two pinions by idling rollers having an external profile matching a belt profile on said internal face.

2. Device in accordance with claim 1 wherein the drive pinion is located in a rear position with respect to the direction of travel of the belts along the assembly line.

3. Device in accordance with claim 1, wherein the idling rollers are provided in elastomeric material at least in a part in contact with the belt.

4. Device in accordance with claim 1, wherein lateral belt-guides are arranged in intermediate positions between the idling rollers.

5. Device in accordance with claim 4, wherein the lateral belt-guides are provided in a form of one of resin and metal shoes.

6. Device in accordance with claim 1, wherein the idling rollers have projections having a height less than a height of the grooves in the belts.

7. Device in accordance with claim 1, wherein the idling rollers are located on a plane higher than that on which are located the pinions.

8. Device in accordance with claim 1 wherein externally and above the belts there are rollers with a vertical axis for lateral containment of the supporting shoes.

* * * * *